US007015466B2

(12) United States Patent
Takáts et al.

(10) Patent No.: US 7,015,466 B2
(45) Date of Patent: Mar. 21, 2006

(54) ELECTROSONIC SPRAY IONIZATION METHOD AND DEVICE FOR THE ATMOSPHERIC IONIZATION OF MOLECULES

(75) Inventors: Zoltán Takáts, West Lafayette, IN (US); Robert G. Cooks, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 10/888,869

(22) Filed: Jul. 9, 2004

(65) Prior Publication Data

US 2005/0029442 A1 Feb. 10, 2005

Related U.S. Application Data

(60) Provisional application No. 60/543,096, filed on Feb. 9, 2004, provisional application No. 60/490,183, filed on Jul. 24, 2003.

(51) Int. Cl.
*B01D 59/44* (2006.01)
*H01J 49/00* (2006.01)

(52) U.S. Cl. ...................... 250/288; 250/282; 204/452; 204/603

(58) Field of Classification Search ................ 250/288, 250/281, 282, 286
See application file for complete search history.

(56) References Cited

U.S. PATENT DOCUMENTS 4,300,044 A 11/1981 Iribarne et al.
4,531,056 A 7/1985 Labowsky et al.
4,667,100 A 5/1987 Lagna
4,794,252 A 12/1988 Bateman et al.
4,861,988 A 8/1989 Henion et al.
4,888,482 A 12/1989 Kato
4,935,624 A 6/1990 Henion et al.
4,963,736 A 10/1990 Douglas et al.
4,977,320 A 12/1990 Chowdhury et al.
4,999,493 A 3/1991 Allen et al.
5,103,093 A 4/1992 Sakairi et al.
5,122,670 A 6/1992 Mylchreesst et al.
5,157,260 A 10/1992 Mylchreest et al.
5,170,052 A 12/1992 Kato
5,171,990 A 12/1992 Mylchreest et al.
5,179,278 A 1/1993 Douglas
5,298,743 A 3/1994 Kato
5,304,798 A 4/1994 Tomany et al.

(Continued)

OTHER PUBLICATIONS

Masamichi Yamashita and John B. Fenn, "Electrospray Ion Source. Another Variation on the Free-Jet Theme", *American Chemical Society*, 1984, pp. 4451-4753.

(Continued)

*Primary Examiner*—Nikita Wells
*Assistant Examiner*—Johnnie L Smith, II
(74) *Attorney, Agent, or Firm*—Brinks Hofer Gilson Lione

(57) ABSTRACT

There is described a device and method for generating gaseous ions of a sample material such as molecules in solution at atmospheric pressure. The device includes a conduit for receiving a solution containing the material to be ionized and form a stream. A jet of gas at supersonic velocity is directed at the stream and interacts therewith. Droplets are formed and by the adiabatic expansion of the gas and vigorous evaporation of the solution gaseous ions are generated. In the method a stream of the sample solution is delivered from a conduit with an electric potential. A gas jet at supersonic velocity interacts with the delivered solution and through the action of adiabatic expansion of the gas and evaporation of the solution gaseous ions are formed.

28 Claims, 11 Drawing Sheets

U.S. PATENT DOCUMENTS

| | | | | |
|---|---|---|---|---|
| 5,306,412 | A | 4/1994 | Whitehouse et al. | |
| 5,345,079 | A | 9/1994 | French et al. | |
| 5,393,975 | A | 2/1995 | Hail et al. | |
| 5,412,208 | A | 5/1995 | Covey et al. | |
| 5,495,108 | A | 2/1996 | Apffel, Jr. et al. | |
| 5,572,023 | A | 11/1996 | Caprioli | |
| 5,608,217 | A | 3/1997 | Franzen et al. | |
| 5,663,561 | A | 9/1997 | Franzen et al. | |
| 5,672,868 | A | 9/1997 | Mordehai et al. | |
| RE35,681 | E | 12/1997 | Mitsui et al. | |
| 5,744,798 | A | 4/1998 | Kato | |
| 5,747,799 | A | 5/1998 | Franzen | |
| 5,750,988 | A | 5/1998 | Apffel et al. | |
| 5,750,993 | A | 5/1998 | Bier | |
| 5,753,910 | A | 5/1998 | Gourley et al. | |
| 5,756,994 | A | 5/1998 | Bajic | |
| 5,788,166 | A | 8/1998 | Valaskovic et al. | |
| 5,825,027 | A | 10/1998 | Takada et al. | |
| 5,838,003 | A | 11/1998 | Bertsch et al. | |
| 5,852,294 | A | 12/1998 | Gulcicek et al. | |
| 5,856,671 | A | 1/1999 | Henion et al. | |
| 5,859,432 | A | 1/1999 | Kato et al. | |
| 5,877,495 | A | 3/1999 | Takada et al. | |
| 5,898,175 | A | 4/1999 | Hirabayashi et al. | |
| 5,962,851 | A | 10/1999 | Whitehouse et al. | |
| 5,969,351 | A | 10/1999 | Nabeshima et al. | |
| 5,986,259 | A | 11/1999 | Hirabayashi et al. | |
| 6,002,130 | A | 12/1999 | Kato | |
| 6,005,245 | A | 12/1999 | Sakairi et al. | |
| 6,011,260 | A | 1/2000 | Takada et al. | |
| 6,043,487 | A | 3/2000 | Waki | |
| 6,060,705 | A | 5/2000 | Whitehouse et al. | |
| 6,075,243 | A | 6/2000 | Nabeshima et al. | |
| 6,087,657 | A | 7/2000 | Kato | |
| 6,114,693 | A | 9/2000 | Hirabayashi et al. | |
| 6,118,120 | A | 9/2000 | Fenn et al. | |
| 6,121,608 | A | 9/2000 | Takada et al. | |
| RE36,892 | E | 10/2000 | Apffel, Jr. et al. | |
| 6,147,347 | A * | 11/2000 | Hirabayashi et al. | ....... 250/288 |
| 6,180,941 | B1 | 1/2001 | Takada et al. | |
| 6,188,065 | B1 | 2/2001 | Takada et al. | |
| 6,190,316 | B1 | 2/2001 | Hirabayashi et al. | |
| 6,207,954 | B1 | 3/2001 | Andrien, Jr. et al. | |
| 6,236,042 | B1 | 5/2001 | Kato et al. | |
| 6,248,999 | B1 | 6/2001 | Mylchreest et al. | |
| 6,252,225 | B1 | 6/2001 | Takada et al. | |
| 6,274,867 | B1 | 8/2001 | Wells et al. | |
| 6,278,110 | B1 | 8/2001 | Apffel et al. | |
| 6,278,111 | B1 | 8/2001 | Sheehan et al. | |
| 6,294,779 | B1 | 9/2001 | Apffel et al. | |
| 6,297,499 | B1 | 10/2001 | Fenn | |
| 6,315,905 | B1 | 11/2001 | Settlage et al. | |
| 6,316,769 | B1 | 11/2001 | Takada et al. | |
| 6,326,616 | B1 | 12/2001 | Andrien, Jr. et al. | |
| 6,335,525 | B1 | 1/2002 | Takada et al. | |
| 6,337,480 | B1 | 1/2002 | Andrien, Jr. et al. | |
| 6,339,218 | B1 | 1/2002 | Kato et al. | |
| 6,350,617 | B1 | 2/2002 | Hindsgaul et al. | |
| 6,380,538 | B1 | 4/2002 | Bajic | |
| 6,384,411 | B1 * | 5/2002 | Hirabayashi et al. | ....... 250/288 |
| 6,392,226 | B1 | 5/2002 | Takada et al. | |
| 6,394,942 | B1 | 5/2002 | Moon et al. | |
| 6,396,057 | B1 | 5/2002 | Jarrell et al. | |
| 6,410,914 | B1 | 6/2002 | Park et al. | |
| 6,410,915 | B1 | 6/2002 | Bateman et al. | |
| 6,417,510 | B1 | 7/2002 | Moon et al. | |
| 6,432,311 | B1 | 8/2002 | Moon et al. | |
| 6,437,327 | B1 | 8/2002 | Takada et al. | |
| 6,446,883 | B1 | 9/2002 | Huang et al. | |
| 6,452,166 | B1 | 9/2002 | Enke et al. | |
| 6,454,193 | B1 | 9/2002 | Busick et al. | |
| 6,454,938 | B1 | 9/2002 | Moon et al. | |
| 6,455,846 | B1 | 9/2002 | Prior et al. | |
| 6,459,081 | B1 | 10/2002 | Kato | |
| 6,461,516 | B1 | 10/2002 | Moon et al. | |
| 6,462,336 | B1 | 10/2002 | Bajic | |
| 6,462,337 | B1 | 10/2002 | Li et al. | |
| 6,464,866 | B1 | 10/2002 | Moon et al. | |
| 6,465,776 | B1 | 10/2002 | Moini et al. | |
| 6,465,779 | B1 | 10/2002 | Takada et al. | |
| 6,472,661 | B1 | 10/2002 | Tanaka et al. | |
| 6,478,738 | B1 | 11/2002 | Hirabayashi et al. | |
| 6,483,108 | B1 | 11/2002 | Sakairi | |
| 6,486,469 | B1 | 11/2002 | Fischer et al. | |
| 6,499,675 | B1 | 12/2002 | Huang et al. | |
| 6,501,073 | B1 | 12/2002 | Mylchreest et al. | |
| 6,525,313 | B1 | 2/2003 | Park | |
| 6,541,767 | B1 | 4/2003 | Kato | |
| 6,541,768 | B1 | 4/2003 | Andrien, Jr. et al. | |
| 6,563,111 | B1 | 5/2003 | Moon et al. | |
| 6,566,652 | B1 | 5/2003 | Kato | |
| 6,569,324 | B1 | 5/2003 | Moon et al. | |
| 6,573,494 | B1 | 6/2003 | Andrien, Jr. et al. | |
| 6,579,452 | B1 | 6/2003 | Moon et al. | |
| 6,581,441 | B1 | 6/2003 | Paul | |
| 6,583,408 | B1 | 6/2003 | Smith et al. | |
| 6,586,731 | B1 | 7/2003 | Jolliffe | |
| 6,593,568 | B1 | 7/2003 | Whitehouse et al. | |
| 6,596,988 | B1 | 7/2003 | Corso et al. | |
| 6,614,017 | B1 | 9/2003 | Waki | |
| 6,621,075 | B1 | 9/2003 | Hindsgaul et al. | |
| 6,627,880 | B1 | 9/2003 | Goodley et al. | |
| 6,633,031 | B1 | 10/2003 | Schultz et al. | |
| 6,639,216 | B1 | 10/2003 | Apffel, Jr. et al. | |
| 6,642,515 | B1 | 11/2003 | Yamaguchi | |
| 6,646,254 | B1 | 11/2003 | Tanaka | |
| 6,646,257 | B1 | 11/2003 | Fischer et al. | |
| 6,649,907 | B1 | 11/2003 | Ebeling et al. | |
| 6,649,908 | B1 | 11/2003 | Apffel, Jr. et al. | |
| 6,653,624 | B1 | 11/2003 | Fukuda et al. | |
| 6,657,191 | B1 | 12/2003 | Park | |
| 6,661,002 | B1 | 12/2003 | Satta et al. | |
| 6,661,003 | B1 | 12/2003 | Fischer et al. | |
| 6,667,474 | B1 | 12/2003 | Abramson et al. | |
| 6,677,593 | B1 | 1/2004 | Van Berkel | |
| 6,737,640 | B1 | 5/2004 | Kato | |
| 6,753,521 | B1 | 6/2004 | Park et al. | |
| 2001/0000618 | A1 | 5/2001 | Takada et al. | |
| 2002/0014585 | A1 | 2/2002 | Takada et al. | |
| 2002/0113144 | A1 | 8/2002 | Huang et al. | |
| 2003/0209666 | A1 | 11/2003 | Hirabayashi et al. | |

OTHER PUBLICATIONS

Yu Lu, et al., "Pulsed Electrospray for Mass Spectrometry", *American Chemical Society*, 2001, pp. 4748-4753.

Fenn, J.B., et al., "Electrospray ionization principles and practice", *Mass Spectrometry Reviews*, John Wiley & Sons, Inc., 1990, 9: 37-70.

Hirabayashi, A., et al., "Sonic Spray Mass Spectrometry", *Anal. Chem.*, American Chemical Society, Sep. 1, 1995, 67(17): 2878-2882.

Hirabaysahi, A., et al., "Sonic Spray Ionization Method for Atomospheric Pressure Ionization Mass Spectrometry", *Anal. Chem.*, American Chemical Society, Dec. 15, 1994, 64(24): 4557-1559.

Lefebvre, A.H., et al., "Energy consideration in Twin-Fluid Atomization", *Journal of Engineering for Gas Turbines and Power*, Transaction of the ASME, Jan. 1992, 114: 89-96.

Loo, J.A., et al., "Peptide and Protein Analysis by Electrospray Ionization- Mass Spectrometry and Capillary Electrophoresis-Mass Spectrometry", *Analytical Biochemistry*, Academic Press, Inc., 1989, 179: 404-412.

Wang, G., et al., "Disparity Between Solution-phase Equilibria and Charge State Distributions in Positive-ion Electrospray Mass Spectrometry", *Organic Mass Spectrometry*, John Wiley & Sons, Ltd., 1994, 29: 419-427.

Wilm, M.S., et al., "Electrospray and Taylor-Cone theory, Dole's beam of macromolecules at last", *International Journal of Mass Spectrometry and Ion Processes*, Elsevier Science B.V., 1994, 136: 167-180.

Andries P. Bruins, Thomas R. Covey, and Jack D. Henion, "Ion Spray Interface for Combined Liquid Chromatography/Atmospheric Pressure Ionization Mass Spectrometry," *American Chemical Society*, (1987) 2642-2646.

* cited by examiner

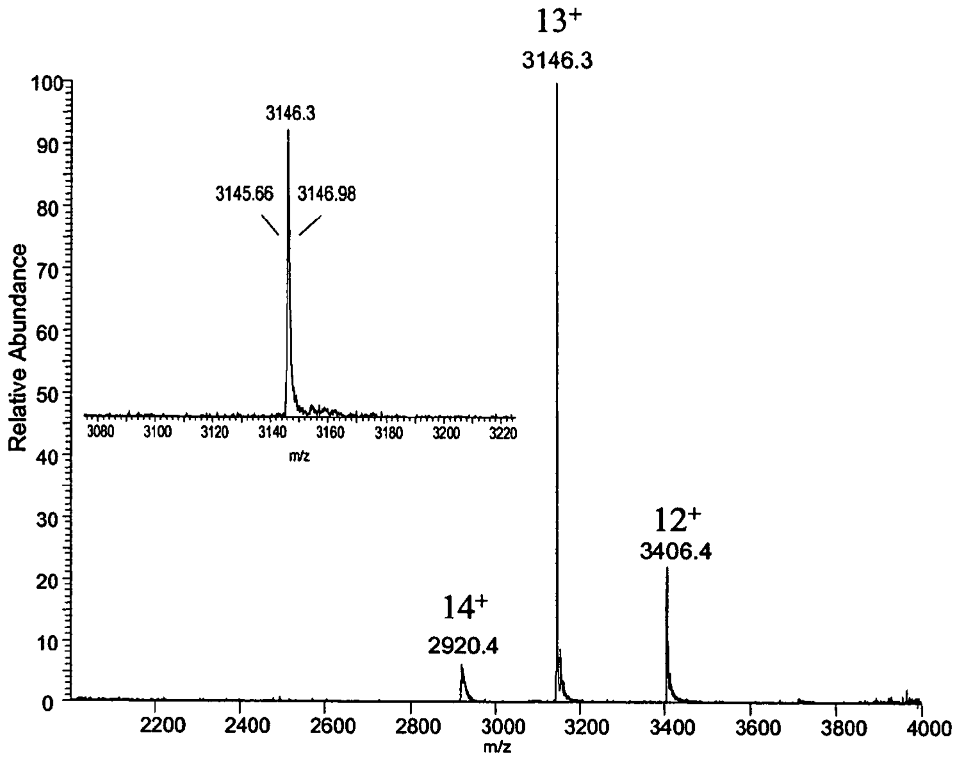
Figure 3.a.
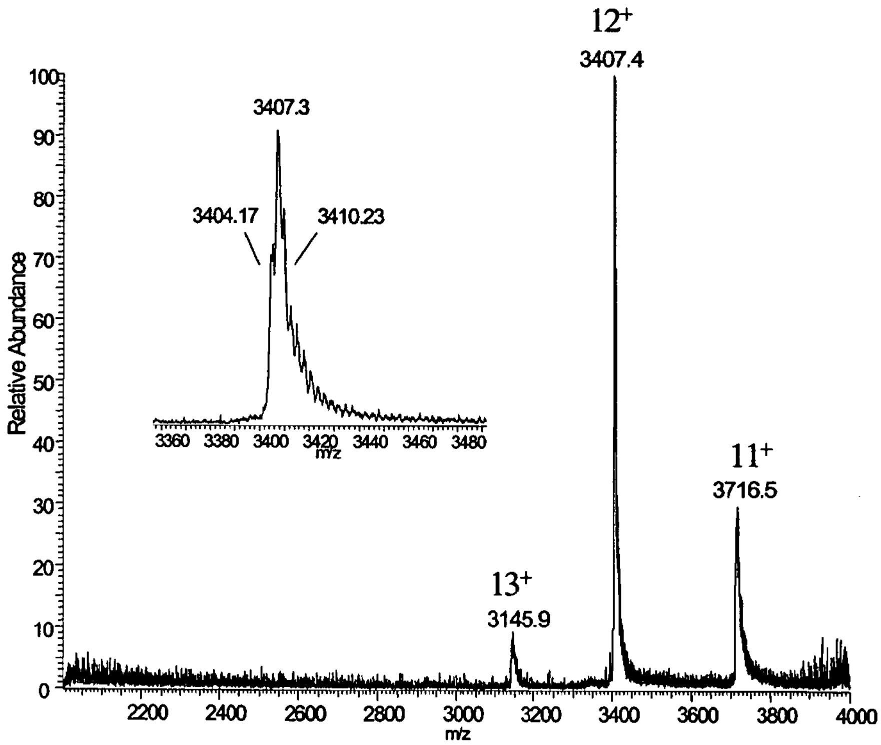
Figure 3. b.

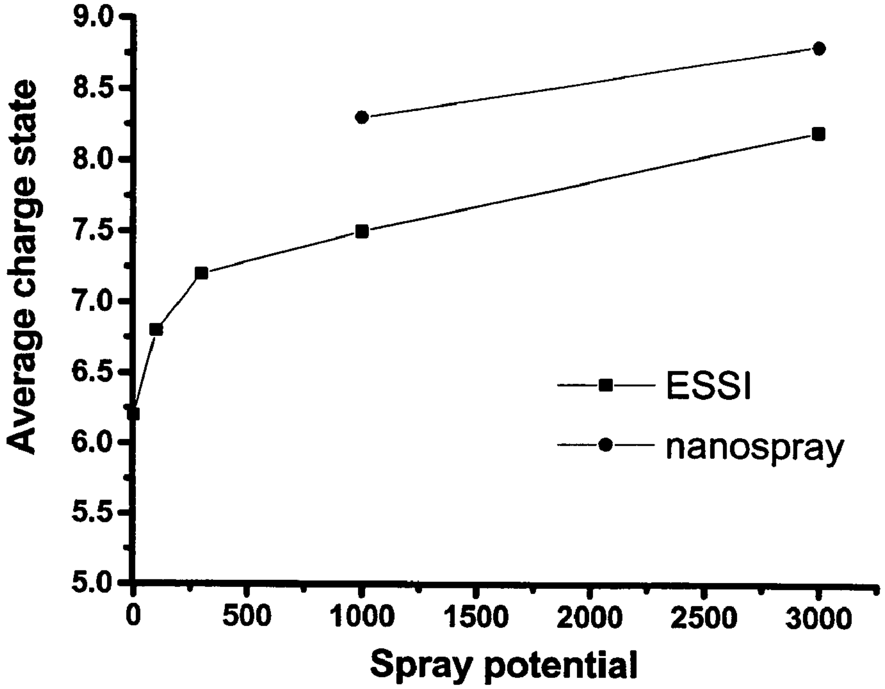
Figure 6. a.
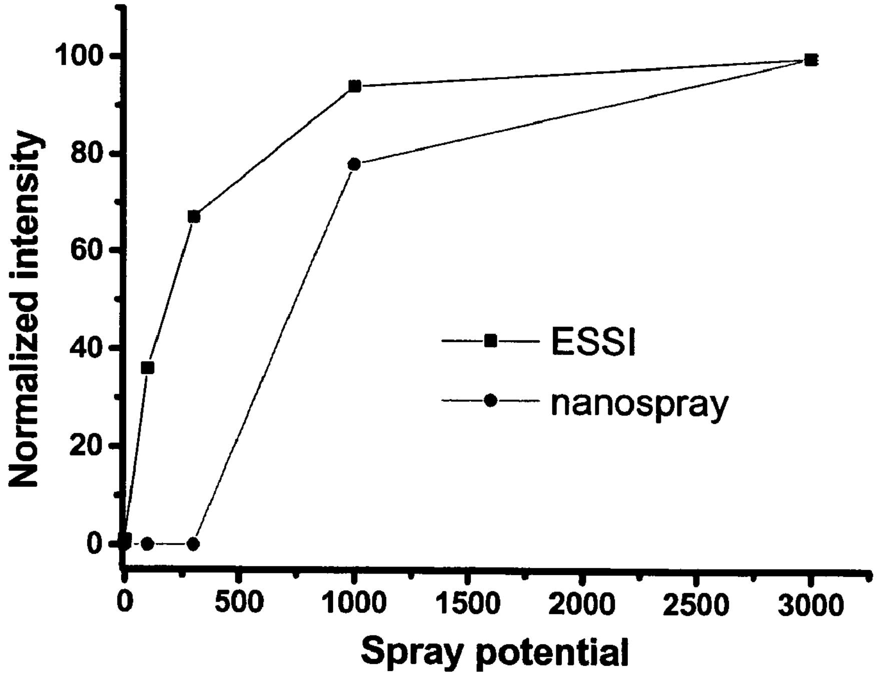
Figure 6.b.

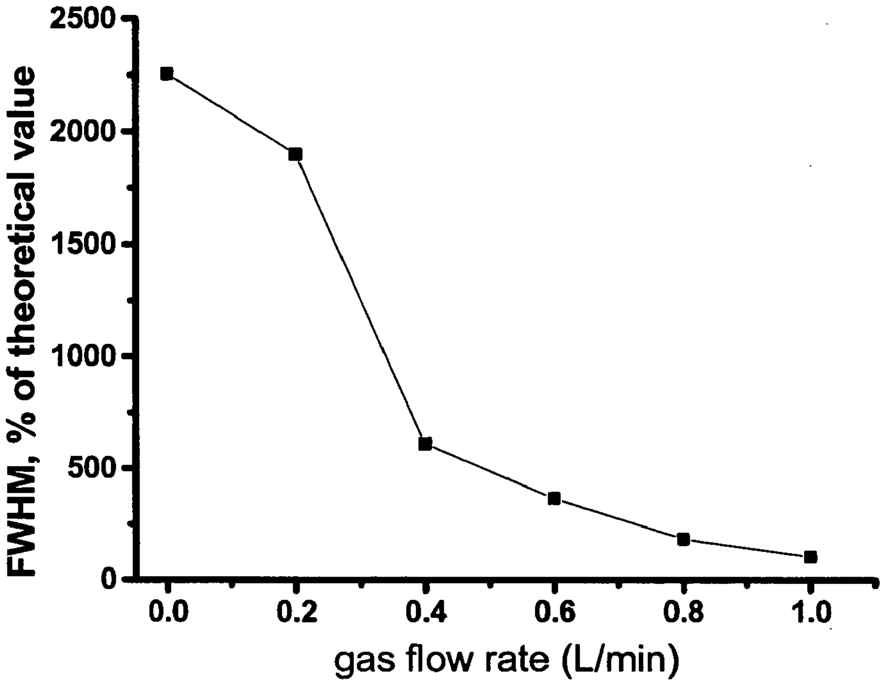
Figure 7.a.
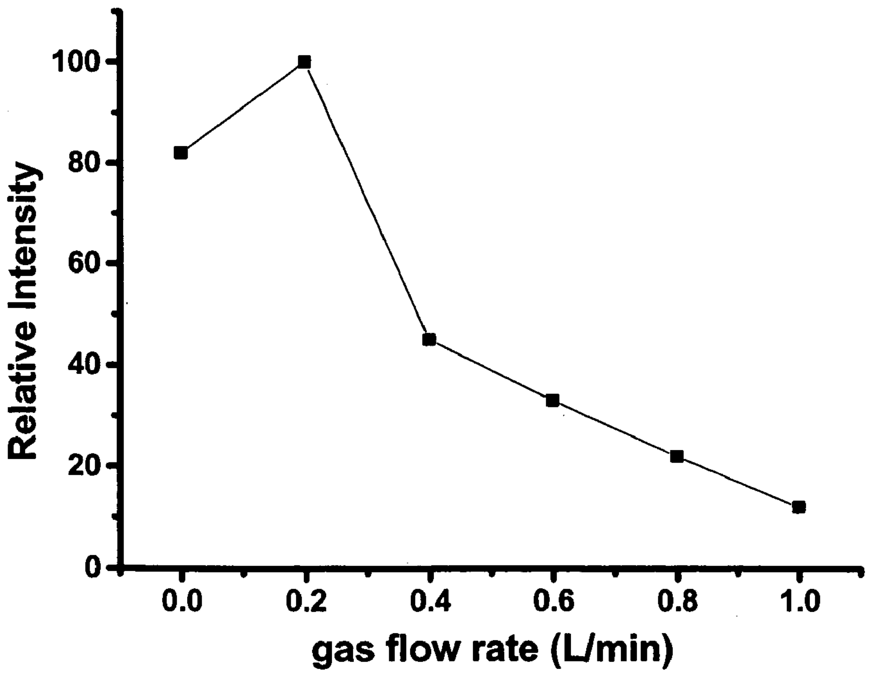
Figure 7.b.

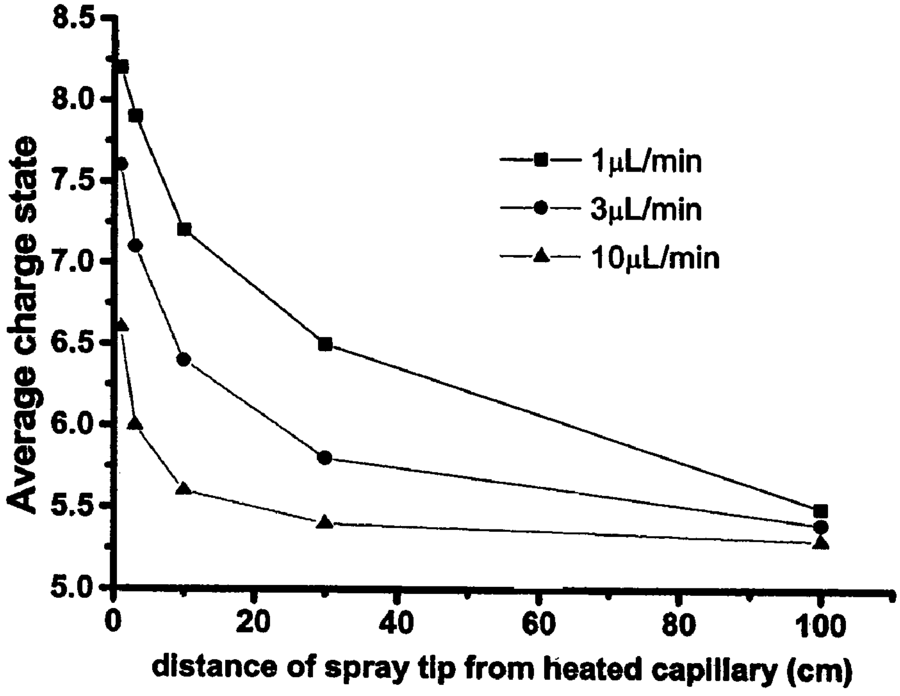
Figure 9. a.
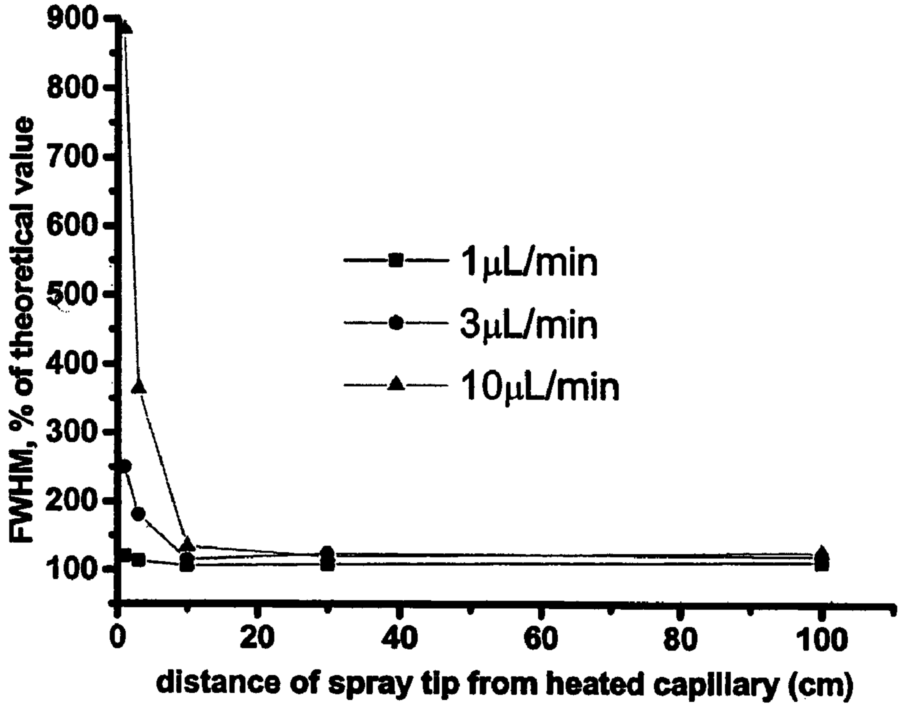
Figure 9.b.

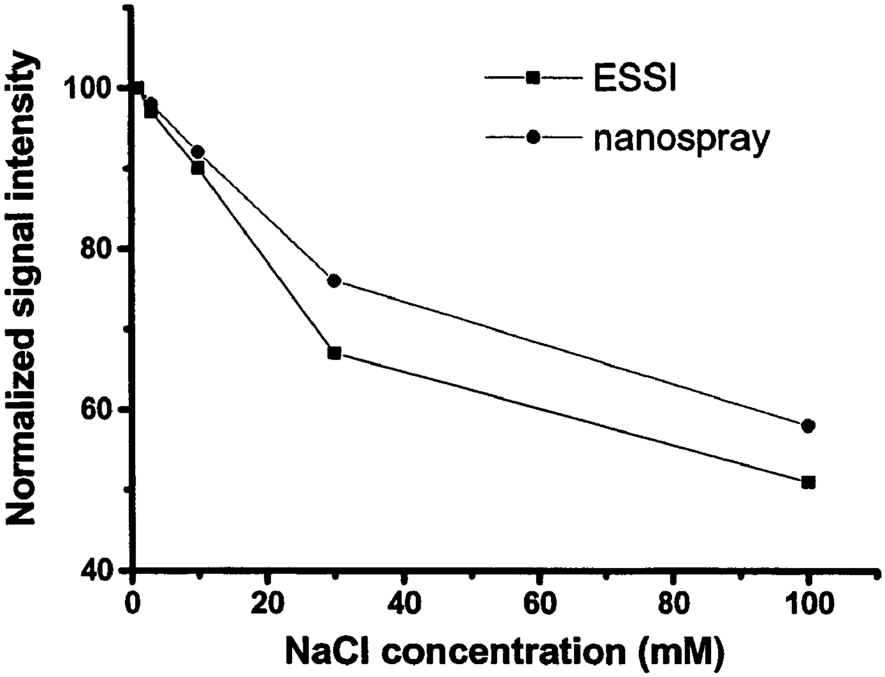
Figure 10.a.
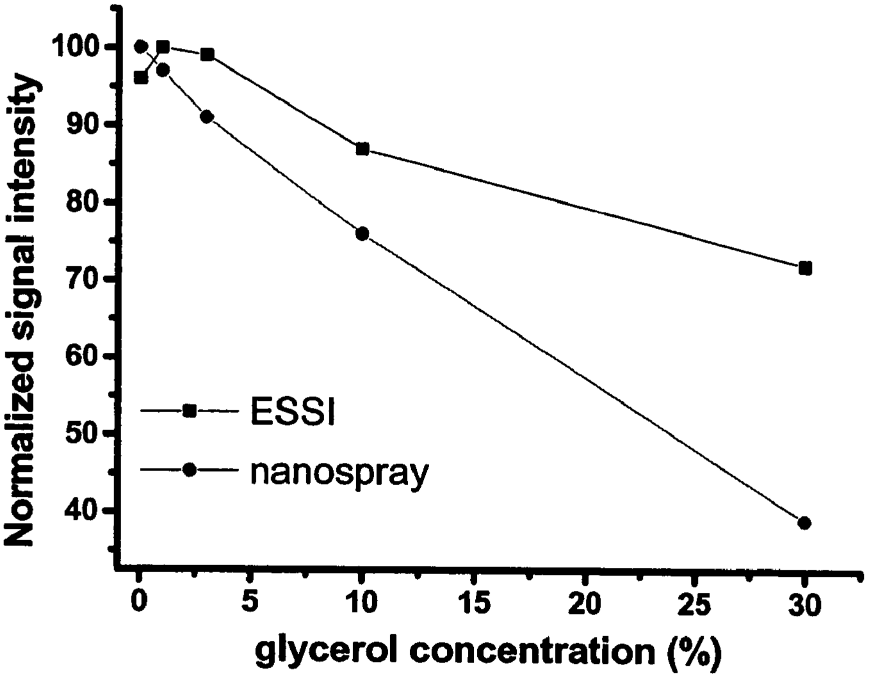
Figure 10. b.

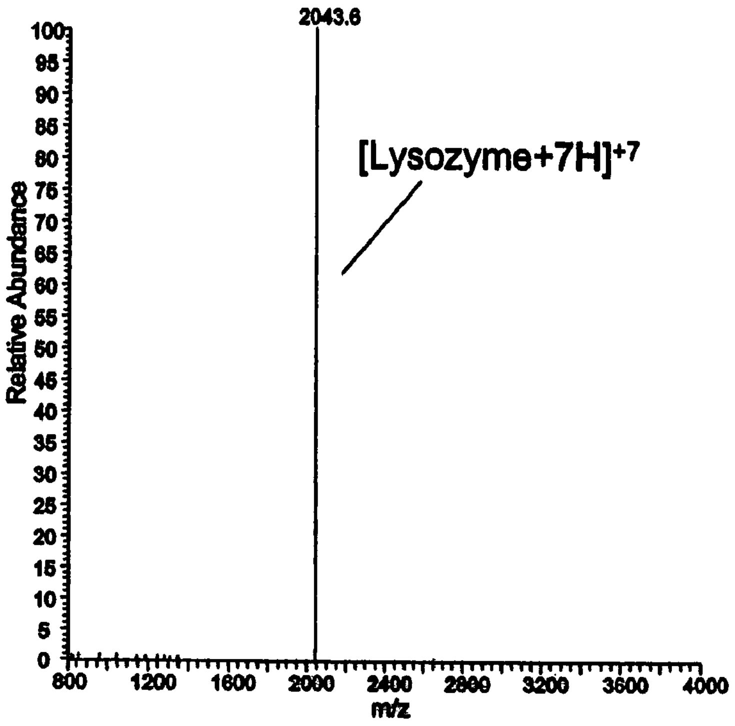
Figure 12.a.
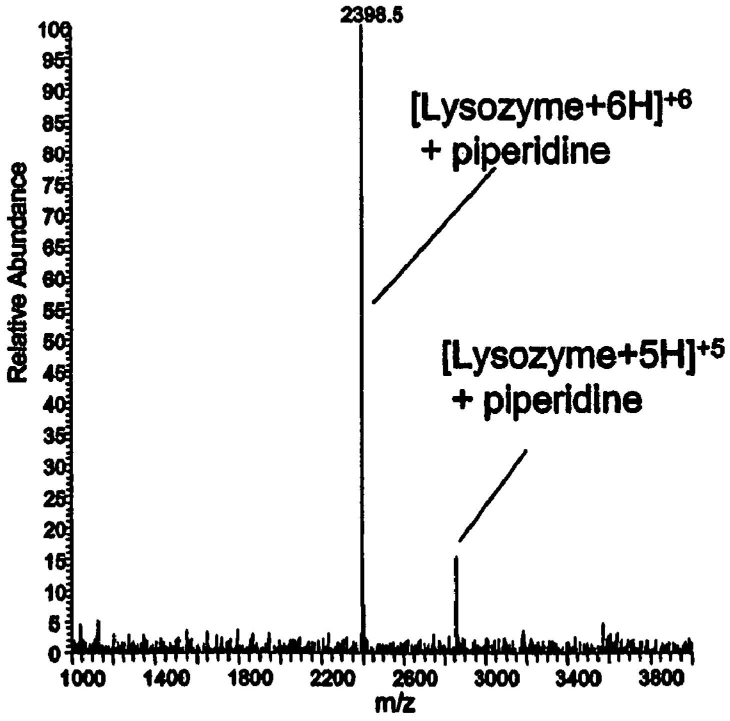
Figure 12.b.

ELECTROSONIC SPRAY IONIZATION METHOD AND DEVICE FOR THE ATMOSPHERIC IONIZATION OF MOLECULES

RELATED APPLICATIONS

This application claims priority to Provisional Patent Applications Ser. Nos. 60/490,183, filed on Jul. 24, 2003 and 60/543,096, filed on Feb. 9, 2004, the disclosures of which are hereby incorporated by reference in their entirety.

FIELD OF THE INVENTION

The present invention relates generally to a device and method for forming gaseous ions of sample material, such as molecules, including biological molecules such as proteins, from a liquid at atmospheric pressure, and more particularly to a device and method in which the liquid containing the sample material or molecules is projected from the end of a capillary maintained at a potential to establish an electric field at the end, and an annular jet of gas at supersonic velocity is directed over the end of the capillary to produce charged ultra-fine particles which by adiabatic expansion of the gas and vigorous evaporation of the liquid forms gaseous ions of the material or molecules at atmospheric pressure.

BACKGROUND OF THE INVENTION

Electrospray ionization (ESI) mass spectrometry[1, 2] has rapidly become an important tool in the field of structural biochemistry. The technique allows folded proteins to be ionized, sometimes with evidence for little change in gross three-dimensional structure. The resulting ions can then be studied in the gas phase using the tools of modern mass spectrometry.[3-8] Not only can single proteins be studied using this methodology, but multi-protein and protein-ligand complexes sometimes can also be ionized intact, although the number of thoroughly studied examples is much smaller. Recently, ionization of such complex structures as a whole ribosome[9] has been demonstrated. Protein complexes in the gas phase can be studied by tandem or multiple-stage mass spectrometry.[10-12] In such procedures, the original complex can be made to undergo successive dissociation processes, revealing the molecular weights of the individual constituents. Unlike most other techniques, mass spectrometry is not restricted to the detection of certain types of constituents of a molecular complex, such as those labeled with fluorophores or otherwise made visible to the analytical method.

Proteins and other biologically relevant macromolecular systems usually show one or a small number of conformations under physiological conditions, a feature essential for playing a well-defined biochemical role. The solution phase structure is generally assumed to be different from the most stable conformation in the gas phase.[3, 4, 9, 13-15] The main requirement for developing successful mass spectrometric techniques is therefore to preserve these metastable solution structures and this demands minimizing the internal energy of the ions in order to keep the gas-phase unfolding or dissociation rates as low as possible. This task is generally performed by avoiding denaturing conditions when the solution is prepared for mass spectrometry and adjusting pressure and lens potential values carefully in the source and atmospheric interface region of the instrument.[10, 16] The key aim in these procedures is to desolvate protein ions and to direct them into the high-vacuum region of a mass spectrometer without affecting the non-covalent interactions that maintain the highly ordered structures. This objective is usually achieved by applying relatively high pressures in the atmospheric interface and low potential gradients throughout the lens system[16]. High gas pressures provide high collision frequencies in the first vacuum region of the instrument, which keeps the ions at low temperatures via collisional cooling and also facilitates efficient desolvation. However, since both the solvent envelope and ion conformation are maintained by non-covalent interactions, there is often a compromise between conditions that preserve the intact structure and those needed for complete desolvation. Furthermore, the instrumental settings that allow gentle desolvation are usually not optimal for ion transfer efficiency, so the sensitivity of the instrument can be seriously degraded.

Nanospray[17, 18] is often the ionization method of choice to achieve gentle desolvation while also providing a high ionization efficiency for small, valuable samples. Unlike traditional commercially available ESI ion sources,[18] nanospray is compatible with aqueous buffers at physiological pH and its sample consumption is one or two orders of magnitude lower due to the high ionization efficiency. High ionization efficiency and efficient desolvation are characteristics usually attributed to the low solution flow rate that is known to reduce the size of the charged droplets initially produced. The smaller initial droplets undergo fewer coulomb-fissions and each evaporates less solvent, which results in lower concentrations of non-volatile matrix components in the final nanodroplet that yields the actual gaseous protein ion. Smaller initial droplet sizes also accelerate ion formation and in this way a higher portion of the droplets will actually be completely desolvated to provide ions that are available for mass analysis. Nanospray is generally assumed to provide better desolvation efficiency than ESI. This feature is attributed to more efficient solvent evaporation from the smaller droplets and lower solvent vapor load on the atmospheric interface due to considerably lower sample flow rates. The intrinsically good desolvation efficiency does not require the application of harsh desolvation conditions in the atmospheric interface (high temperature, high cone voltage, etc.), which in turn enhances the survival of fragile biochemical entities including non-covalent complexes. In spite of these advantages, nanospray mass spectra depend strongly on the nanospray tip used; the tip-to-tip reproducibility of spectra is weak. Furthermore, tip geometry may change due to arcing or break during operation. Another difficulty with nanospray is the lack of control over the spray process: in practice the spray cannot be adjusted, it can only be turned on and off by changing the high voltage.[19, 20] High flow rates and extremes of pH are generally required.

Both in the case of nanospray and conventional forced-flow, pneumatically assisted electrospray, the absolute sensitivity is influenced not only by the width in m/z units of individual peaks, but by the shape and width of the overall charge state distribution. The shapes of charge state distributions are frequently used as a diagnostic tool for determining the degree of unfolding of proteins in the course of ionization.[21-26] Broad charge state distributions at high charge states are generally associated with unfolded structures, while narrow distributions at lower charge states are treated as diagnostic of native or native-like folded ion structures in the gas phase. A model developed recently by Kebarle et al. evaluates the maximum number of charges of protein ions based on the relative apparent gas phase basicities (GB) of possible charge sites on the protein molecule.[26-29] This model describes protein ion formation from buffered solutions in electrospray via the formation of proton-bound complexes with buffer molecules at each charge site and the subsequent dissociation of these complexes. The branching ratios for dissociation of these complexes depend on the relative apparent GB of the buffer molecule (e.g. ammonia in the case of ammonium buffers) relative to that of the protein charge site. Apparent GB values of particular sites on proteins can be estimated based on the intrinsic GB values of chemical moieties, the electric permittivity of the protein molecule and the spatial distribution of charges, which latter factor is related to the size of the protein ion. The observed charge state distribution is a result of these factors, the temperature of desolvation and any further charge reduction as a result of ion/molecule reactions occurring in the atmospheric interface or during passage through the ion optics of the mass spectrometer.

In principle, the spray process and charging of the sample can be decoupled and the originally charged liquid can initially be finely dispersed by a different spraying technique. This approach is widely implemented in commercial ESI sources by means of pneumatic spraying,[30] often in order to roughly disperse the large amounts of liquid sample coming from a standard liquid chromatograph. Since $d \sim 1/v_g^2$ where d is the mean diameter of droplets, $v_g$ is the linear velocity of the nebulizing gas at high linear gas velocities and high gas/liquid mass flow ratios, droplet sizes comparable to nanospray can be achieved theoretically.[31]

Although complete ionization of complex sample materials, such as proteins, that are supplied in an aqueous solution buffered to a physiological pH has been achieved to some degree in the reduced atmosphere of a mass spectrometer capable of sampling at atmospheric pressure, gaseous ionization of samples to yield substantially a single species for each component of the solution when the material is a protein in an aqueous solution buffered to physiological pH has not been known previously. Careful investigation of ESI has determined that, in fact, ionized liquid droplets are produced by prior art methods. The ionized liquid is sampled and evaporation is completed in the mass spectrometer after the droplets have been heated and sometimes subjected to multiple collisions, resulting in some unfolding of protein samples, which leads to an undesirably broad charge distribution. Complete gaseous ionization of a sample material from a solution outside a mass spectrometer has not previously been accomplished although progress in this direction is being made by the method of laser-assisted spray ionization.[32]

OBJECTS AND SUMMARY OF THE INVENTION

It is an object of the present invention to provide devices and methods for producing gaseous ions of sample materials from a liquid containing the material at atmospheric pressure.

It is another object of the present invention to provide an ionizer device for ionizing a sample material, such as molecules, in a liquid which includes a sample capillary for receiving the liquid at one end and projecting it as a liquid stream from the other end, a voltage source for providing a voltage at the end of the capillary to establish an electric field, and an outer tube surrounding and spaced from the capillary to form an annular space through which pressurized gas flows to form a jet of gas traveling at supersonic speed surrounding the liquid stream to form ultra-fine charged droplets which by adiabatic expansion of the gas and evaporation of the liquid form gaseous ions of the material or molecules at atmospheric pressure. The device may also include at least one of (i) a means for adjusting the velocity of the gas stream relative to the velocity of the delivered liquid stream above a supersonic threshold, (ii) a means for adjusting the strength of the electrical potential, (iii) a means for adjusting the position of the end of the first capillary conduit relative to that of the second capillary conduit and (iv) a means for adjusting the device operating temperature.

There is provided a method for producing gaseous ions of substantially a single species from a sample material in solution comprising delivering the solution under electrical potential into a gas stream moving at least supersonically relative to the liquid.

An ionizer device is provided which includes a capillary for receiving a liquid having in solution a sample material and projecting a liquid stream from the other end, means for creating an electric field at the other end of the capillary and means for directing an annular jet of gas past the other end of the first capillary in the same direction as the projected stream at a velocity of at least 350 m/s to thereby produce charged ultra-fine droplets which by the adiabatic expansion of the gas and the vigorous evaporation of the liquid provides gaseous ions of the sample material.

A mass analyzer having a sampling port capable of sampling ions at atmospheric pressure is positioned to receive the gaseous ions formed by the ionizer device of the present invention and provide a mass analysis of the ionized sample material.

BRIEF DESCRIPTION OF THE DRAWINGS

The invention will be more clearly understood from the following description when read in conjunction with the accompanying drawings of which:

FIGS. 3(*a*) ESSI and (*b*) on-line nanospray spectrum of bovine protein kinase A catalytic subunit (200 nM in 10 mM aqueous ammonium-acetate, pH 7.8).

FIGS. 6(*a*) Signal intensity and (*b*) average charge of hen egg-white lysozyme ions as a function of spray potential using 0.01 mg/mL lysozyme dissolved in 10 mM ammonium acetate at pH 7.8 in the case of ESSI and nanospray.

FIGS. 7(*a*) Peak width at half height as a percentage of theoretical value, (*b*) overall intensity (peak area) of bovine PKAc ions as functions of nebulizing gas flow rate.

FIGS. 9*a–b* Average charge and peak width of hen egg-white lysozyme ions as function of distance measured between spray tip and atmospheric interface.

FIGS. 10a–b Intensity of hen egg-white lysozyme ions as a function of (a) NaCl and (b) glycerol concentration; (c) width of base peak in the same system as function of NaCl concentration using 5 μm ID tip for ESSI and 2 μm ID tip for a nanospray experiment.

FIG. 12(a) ESSI spectrum of lysozyme (100 nM in 10 mM aqueous ammonium-acetate, pH 7.8) sprayed from 30 cm distance. (b) Similar experiment, spray allowed to interact with saturated vapor of piperidine.

DETAILED DESCRIPTION OF THE INVENTION

A micro-electrospray[33] system equipped with variable potential and high velocity nebulizing gas is provided and is compared to the well-established ESI techniques of micro-ESI and nanospray. The novel method is termed electrosonic spray ionization or "ESSI", as it utilizes a supersonic gas jet similar to Hirabayashi's sonic spray technique.[34, 35] The novel method produces ultra-fine initial droplets at low temperature (caused by adiabatic expansion of nebulizing gas and vigorous evaporation of solvent) and consequently it gives narrow peak shapes and narrow charge state distributions for protein samples ionized under physiological conditions.

Figure 1:
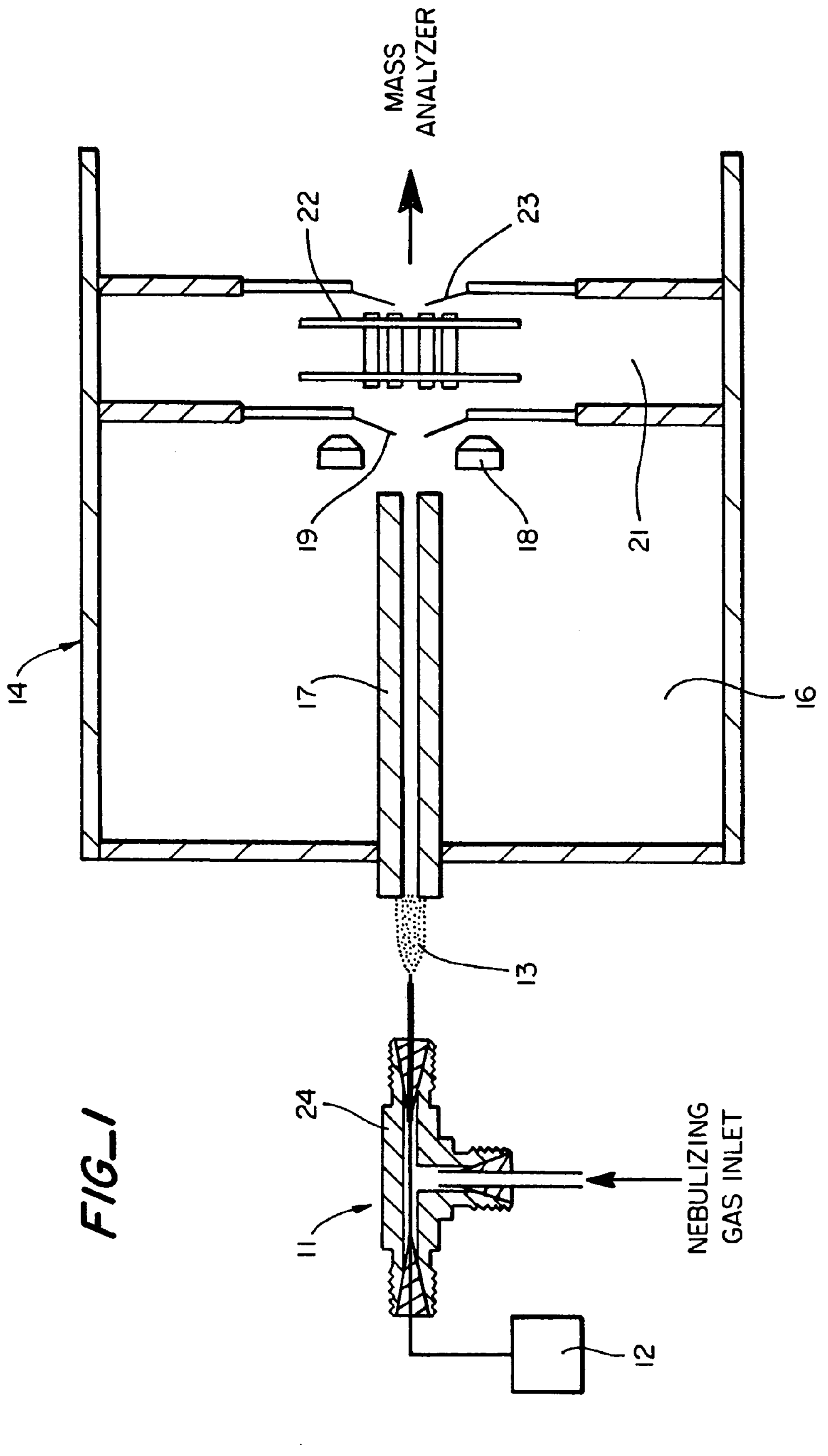
FIG. 1 shows schematically a mass analyzing system incorporating the ionizer device of the present invention.

Referring to FIG. 1, an atmospheric pressure electrosonic spray ionization device (ESSI) 11 in accordance with the present invention is shown connected to receive a sample material in a liquid form from associated apparatus such as a liquid chromatograph 12. The electrosonic spray ionization device to be presently described in detail forms and delivers gaseous ions 13 of the sample material at atmospheric pressure to, for example, a suitable mass analyzer 14. The front section of the mass analyzer 14 used to carry out the experiments to be presently described is schematically shown in FIG. 1. The illustrated front section is that of a mass spectrometer purchased from Thermo Finnigan Corporation, Model LCQ Classic. The ions are transported through a heated capillary port into a first chamber 16 which is maintained at a lower pressure (approximately 1 Torr) than the atmospheric pressure of the ionization source 11. Due to the difference in pressure, ions and gases are caused to flow through a heated capillary 17 into the chamber 16. The end of the capillary is surrounded by a tube lens 18 which provides an electrostatic field which focuses the ion beam leaving the capillary towards the skimmer aperture 19. The ions then travel through a second region 21 at a higher vacuum and are guided by ion guide 22 through a second skimmer 23 into the mass analyzer. It will be apparent to one skilled in the art that the ESSI device can be used with any kind of mass analyzer, including magnetic sector, quadrupole, time-of-flight, ion trap (both 2D and 3D), FT-ICR, orbitrap, or any combination of these. Furthermore, the source is also compatible with ion mobility spectrometers of any kind.

Figure 2:
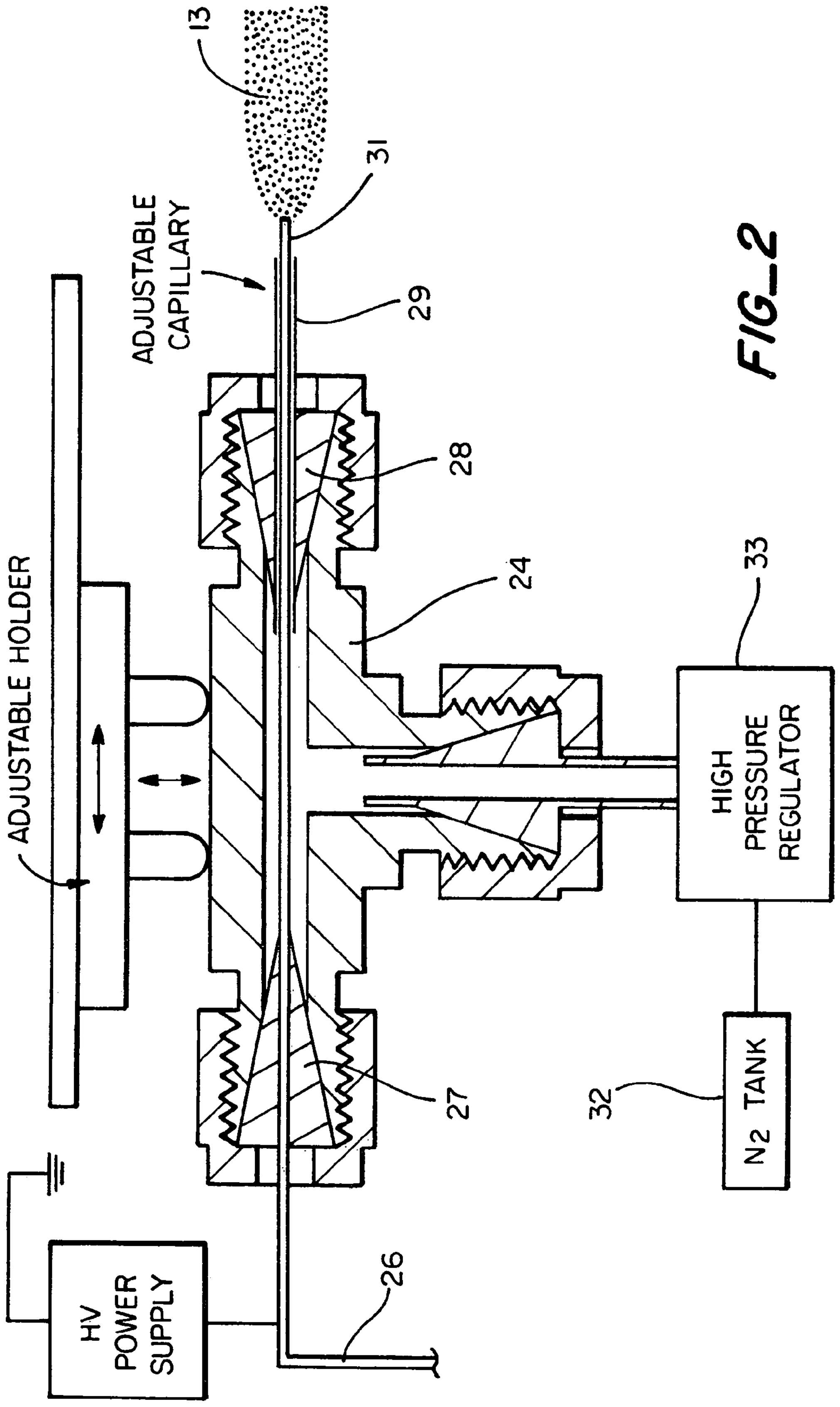
FIG. 2 shows schematically and in elevated cross section one embodiment of the ionizer device of the present invention.

Referring now in particular to FIG. 2, which is an enlarged view of the electrosonic spray ionization device 11, the device includes a T-element 24 having threaded ends. A sample capillary 26 is supported by a ferrule 27 and extends through and beyond the element. A second ferrule 28 supports a second capillary or tube 29 which has an inner diameter greater than the outside diameter of the sample capillary 26 to provide an annular space between the sample capillary and the outer capillary or tube. The end 31 of the sample capillary extends beyond the end of the outer capillary. The amount of extension of the sample capillary beyond the outer capillary can be adjusted by moving the sample capillary with respect to the outer capillary or vice versa. In operation the distance is controlled to achieve the best operating conditions. The other element of the T-element is connected to a nitrogen or other gas tank 32 via a high pressure regulator 33 which regulates the pressure of the gas entering the T-element and exiting through the annular space surrounding the liquid capillary. Each of the ferrules is retained by nuts threaded to the T-element.

The dimensions for a typical electrosonic spray ionization device in accordance with the invention are as follows:

sample capillary—5–100 μm ID, 0.15 mm OD outer capillary—0.025 cm ID, 0.40 mm OD distance between the tips of the liquid capillary and outer capillary—0.1–0.2 mm voltage applied to the liquid capillary and liquid—±0–4 kV gas pressure—approximately 8–25 bar sample flow rate—0.05–50 μL per minute The material for the capillaries is preferably fused silica although other types of materials can be used, preferably the sample capillary is conductive whereby a voltage can be applied through the capillary to the tip. The outer capillary may be a tube of any suitable material. However, fused silica has been found to be suitable.

In operation in accordance with the invention, a voltage is applied to the sample capillary whereby an electric field is established at the end of the capillary. Sample material, such as molecules including biological molecules such as proteins, in a liquid is caused to flow through the capillary and project as a stream of liquid from the end of the capillary. The gas pressure is adjusted such as to provide an annular jet at the end of the annular space between the liquid capillary and the outer capillary at a velocity greater than 350 m/sec, preferably 330–1000 m/s and more preferably 400–700 m/s, whereby to generate charged ultra-fine droplets or particles which are then subjected to the adiabatic expansion of the gas and the vigorous evaporation of the liquid to provide gaseous ions of the sample material at atmospheric pressure.

All spectra to be described were recorded using a Thermo Finnigan LCQ Classic mass spectrometer equipped with either an ESSI source similar to the electrosonic spray ion device (shown in FIG. 1) or with a nanospray source. A voltage in the range of 0–4 kV was applied to the liquid sample through a copper alligator clip attached to the stainless steel tip of the syringe used for sample infusion. The temperature at which the experiments were conducted was room temperature; however, the temperature range is from ambient to boiling point of the solvent, viz 20° C.–100° C. for water. The ion source was carefully aligned to the atmospheric interface of the mass spectrometer 14 to achieve the highest sensitivity and narrowest peak widths, unless stated otherwise. Typical instrumental parameters are summarized in Table 1.

TABLE 1

Instrumental settings used for the LCQ instrument

| Parameter | Value |
|---|---|
| sample flow rate | 3 μL/min |
| nebulizing gas flow rate | 3 L/min |

TABLE 1-continued

Instrumental settings used for the LCQ instrument

| Parameter | Value |
|---|---|
| spray potential | 2000 V |
| heated capillary temperature | 150° C. |
| tube lens potential | 120 V |
| spray distance from heated capillary | 5 cm |
| octapole float voltage | −1.3 V |
| heated capillary voltage | 30 V |

Nanospray spectra were obtained by using PicoTip™ electrospray tips (New Objective Inc., Woburn, Mass.) with internal diameters of 1±0.5 μm or 2±0.5 μm. Lysozyme, cytochrome c, alcohol dehydrogenase, bovine serum albumin, myoglobin, apomyoglobin and insulin were purchased from Sigma (St Louis, Mo.), hexokinase, trypsin and chymotrypsin were obtained from Worthington (Lakewood, N.J.), protein kinase, a catalytic subunit (PKAc) was obtained from Promega (Madison, Wis.). PKAc was buffer exchanged from the original 350 mM $KH_2PO_4$ solution to a 200 mM ammonium acetate solution using Microcon YM-10 centrifugal filter units (Millipore, Billerica, Mass.). Other proteins were simply dissolved in aqueous ammonium acetate buffer. The pH values of the buffers were adjusted by addition of 1 M aqueous ammonium hydroxide or acetic acid solution.

An electrosonic spray mass spectrum and, for purposes of comparison, a nanospray mass spectrum of bovine protein kinase A catalytic subunit (PKAc), recorded under near-physiological solution-phase conditions (pH 7.8, aqueous ammonium acetate buffer), are shown in FIGS. 3*a* and 3*b*, respectively. There are substantial differences between the two spectra in terms of the observed peak widths and the charge state distributions.

A similar phenomenon was observed for a number of other of proteins, as summarized in Table 2. In the case of ESSI, the observed full-width half-maximum (FWHM) values for abundant (relative abundance greater than 10%) protein ions are in the range of 100–150% of the theoretical value calculated from the isotopic distribution, while in the case of nanospray ionization, typical FWHM values are 2 to 8 times greater than the theoretical value.

TABLE 2

Comparison of protein spectral characteristics using ESSI and nanospray (nS)

| | Peak width (% of theoretical FWHM) | | Base peak and its contribution to overall intensity | |
|---|---|---|---|---|
| Protein | ESSI | nS | ESSI | nS |
| Lysozyme(egg-white) | 105 | 126 | +6 (70%) | +8(34%) |
| Cytochrome C (equine) | 103 | 155 | +6 (98%) | +7(21%) |
| Myoglobin (bovine) | 110 | 260 | +7 (85%) | +6(38%) |
| Protein kinase A catalytic subunit(bovine) | 102 | 510 | +13 (78%) | +12(49%) |
| Hexokinase (yeast) | 117 | 690 | +14 (100%)* | +14(24%) |
| Alcohol dehydrogenase (monomer, yeast) | 115 | 340 | +12 (72%) | +10(26%) |
| Trypsin (porcine) | 109 | 250 | +9 (76%) | +7(33%) |
| Chymotrypsin (porcine) | 105 | 220 | +10 (71%) | +8(41%) |
| Concanavalin A (monomer) | 112 | 310 | +11 (66%) | +10(18%) |
| Insulin (bovine) | 109 | 142 | +4 (57%) | +3(45%) |
| BSA | 107 | 760 | +17 (100%)* | +17(38%) |

*No other ions observed due to high mass limit of instrument

A second point of comparison of the two ionization methods is the charge state distribution. That observed using ESSI is similar or narrower than the charge state distribution recorded using nanospray, depending on the protein studied. In most cases a single charge state dominates the ESSI spectrum while ions due to the others do not exceed 25% relative abundance. In the case of nanospray, similar phenomena are observed in only a few proteins, both in our experiments and in literature data.

Figure 4:
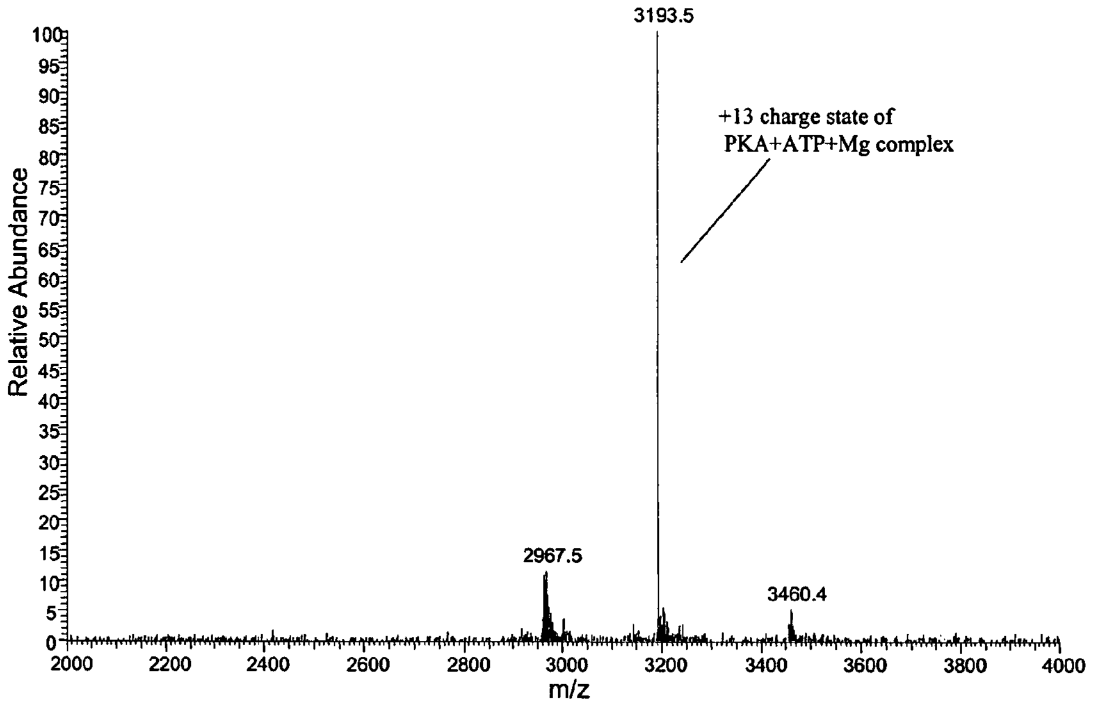
FIG. 4 ESSI spectrum of bovine protein kinase A catalytic subunit (200 nM in 10 mM aqueous ammonium-acetate, pH 7.8) in the presence of 100 μM ATP Mg salt. The enzyme also suffers autophosphorylation on two sites which causes a further shift in observed m/z's.

In contrast to the almost complete elimination of solvent adducts in the case of ESSI, the survival of specific biological complexes is excellent. This is illustrated by FIG. 4 which shows protein kinase A catalytic subunit after conversion to its ATP/Mg adduct by addition of excess ATP Mg salt (autophosphorylation also takes place at two sites), causing a further shift in the observed m/z value. The resulting complex is transferred intact into the gas phase using ESSI. Note that the survival rate of the complex is higher than 95%, and that the high ATP and Mg concentrations have no observable effect on spectral characteristics. Similar results were achieved for other protein-ligand complexes including lysozyme-hexa-N-acetyl-chitohexaose, alcohol dehydrogenase-NADH, and hexokinase-glucose.

Characteristic features of ESSI and nanospray are shown in Table 3.

TABLE 3

Analytical performance of ESSI compared with nanospray

| | ESSI tip OD | | | nanospray |
|---|---|---|---|---|
| | 100 μm | 50 μm | 10 μm | tip OD 2 μm |
| Relative response factor | 1 | 4 | 12 | 15 |
| Detection limit for PKAc (concentration giving 3:1 S/N); ng/μL | 0.44 | 0.11 | 0.05 | 0.03 |
| Dynamic range (orders of magnitude) | 4–5 | 4–5 | 3–4 | 2–3 |
| Flow rate (μL/min) | 0.5–300 | 0.1–30 | 0.02–10 | 0.1 |

Figure 5:
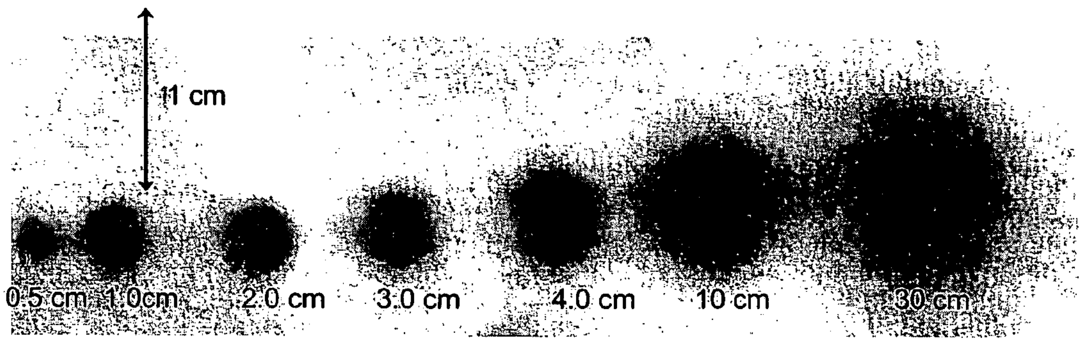
FIG. 5 Cross-section of ESSI spray recorded as a function of distance from spray tip by ionizing 10 mM $[Fe(bipyridl)_2]^{2+}$ and exposing a sheet of paper to the spray. Spray parameters: 1 μL/min sample flow rate, 3 L/min $N_2$ nebulizing gas, 2 kV spray potential.

The detection limits of the two techniques are comparable although the absolute response factor for nanospray is better (nanospray gives higher signal intensity for the same sample, but the S/N ratio is similar). The difference between response factors is associated with the spray divergence of ESSI, data on which are illustrated in FIG. 5. Using a 0.5 mm sampling orifice (standard value for Thermo Finnigan heated capillaries) 50–90% of the nanospray droplets enter the instrument under optimized conditions, while the sampling efficiency for ESSI is only 5–25%. It should be possible to overcome this disadvantage by using an atmospheric interface with a different geometry. Response factors were obtained by ionizing protein solutions at different concentrations. Detection limit values shown in Table 3 reflect the protein concentration where a 3:1 signal-to-noise ratio was observed for the most abundant protein ion.

The dependence of signal intensity and spectral characteristics on the high voltage (HV) in the case of ESSI and nanospray is considerably different (FIGS. 6*a* and 6*b*). Since spray formation and droplet charging are separate processes, the ESSI ion source produces ions at any voltage setting, while in the case of nanospray there is a particular onset voltage at which the spray is stabilized. The ability to "tune" the voltage is a significant practical advantage for ESSI. A pure sonic spray spectrum is observed at 0 V and both the intensity and spectral characteristics (peak width, average charge state) in ESSI change tremendously with increasing potential in the low voltage regime. The appearance of multiply-charged ions in protein spectra in the absence of an electric field has not been reported previously. At roughly the threshold voltage of nanospray the ESSI signal stabilizes, and besides a small effect on intensity, spectral features are voltage independent in the 0.8–4 kV range for typical proteins. Since ESSI produces measurable ion currents over the entire voltage range, there is no need for "ignition" of the ionization in this case. Another advantage of ESSI is the lack of arcing, probably because the turbulent flow of nitrogen hinders the formation of a corona discharge.

The factor that most obviously distinguishes ESSI from other variants of electrospray is the gas flow rate. The dependence of the ESSI peak width and overall signal intensity on the nebulizing gas flow rate is shown in FIGS. 7*a* and 7*b*. The peak width dramatically decreases with increasing nebulizing gas flow rate and converges onto the theoretical value, i.e. the width of the isotopic envelope. It is seen that the dramatic change in peak width occurs at a flow rate of about 0.35 L/min and above and is most dramatic at 0.4 L/min. The gas velocity is calculated by dividing the volumetric flow rate by the cross section of the annular passage at atmospheric pressure. In the ESSI device used to obtain the data 1 L/min represents 943.14 meters per second (m/s). Thus flow velocity greater than 330 m/s are suitable for carrying out the present invention to obtain sharp peaks. We have found the preferred range of velocities to be 400–700 m/s. The overall intensity (peak area) decreases at higher nebulizing gas flow velocity, though this effect is partially balanced by the improved peak shape. Changes in the nebulizing gas flow rate shift the primary droplet formation mechanism from pure electrospray towards pure pneumatic spray. The increasing gas flow rate also changes the temperature of the spray via adiabatic expansion of the gas and allows more efficient solvent evaporation. The changes in spectral characteristics are associated with these two factors, while the observed drop of signal intensity is caused by the higher linear velocity of the ions leaving the heated capillary. This latter factor decreases the sampling efficiency of the tube lens-skimmer system.

Figure 8:
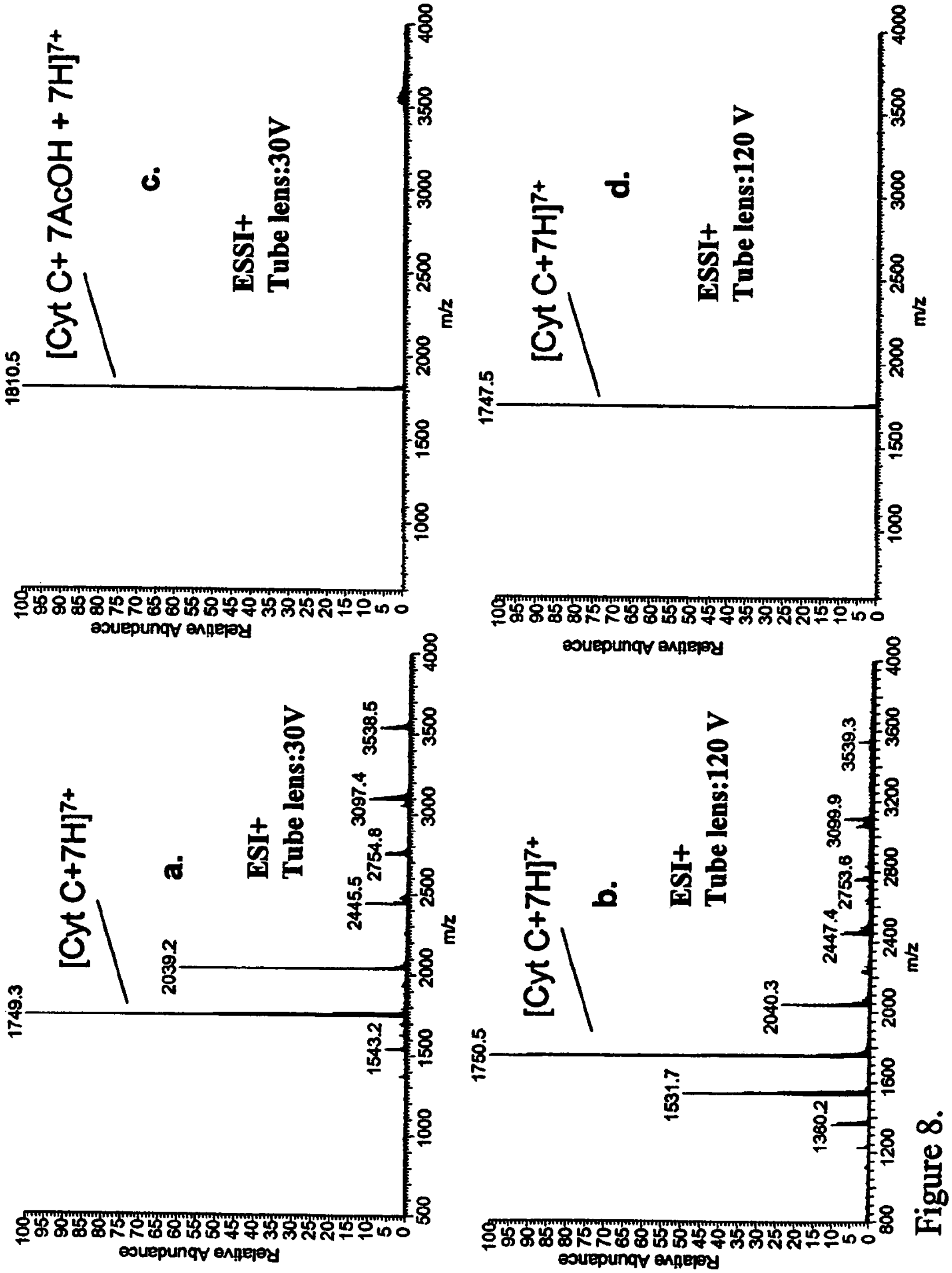
FIGS. 8*a–d* Spectra of bovine cytochrome C, 0.01 mg/ml in 10 mM aqueous ammonium-acetate, taken under different conditions.

Yet another noteworthy feature of ESSI ionization is the weak dependence of spectral characteristics on various settings of the atmospheric interface, including the temperature and potential gradients. In the case of nanospray or ESI using a commercial ion source, both the desolvation efficiency and the charge state distribution are strongly influenced by these parameters. Using steep potential gradients (high tube lens or cone voltages) in the case of ESI or nanospray ionization, the average charge can be shifted towards higher values as shown in FIGS. 8*a* and *b*. The corresponding ESSI data (FIGS. 8*c* and *d*) show a weaker effect.

Spectral characteristics of ESSI show a strong dependence on spray position along the axis (FIGS. 9*a* and 9*b*). Broadening of mass spectral peaks occurs when the tip is too close to the entrance cone and is associated with the larger amount of solvent entering the mass spectrometer, causing the re-solvation of ions in the instrument. This explanation is supported by the dependence of resolution on sample flow rate which shows a similar deterioration of extent of desolvation at high sample flow rates (>50 μL/min under conditions listed in Table 1). At larger distances, complete desolvation is often accompanied by a small shift in the average charge state, suggesting that charge reduction of ions occurs in the atmospheric pressure region. Multiply-charged protein ions undergo both hydrogen-bonded adduct formation and dissociation while interacting with solvent and buffer molecules in the high pressure regime of instrument. Since the dissociation of a neutral solvent molecule from an ion in a particular charge site is a reversible process and charge reduction is not, even those charge sites having GB values higher than any other species present will undergo slow charge reduction.[24, 26] Despite this charge reduction process, protein solutions can be sprayed from distances as great as 3 m (meters) using ESSI, still giving signals with S/N ~30 in typical cases. This observation opens up new possibilities for studying ion-molecule reactions of biological compounds at atmospheric pressure.

The sample flow rate of ESSI overlaps with that of nanospray; however the average sample consumption of the latter is usually lower, and this facilitates off-line experiments. (Using 10 μm ID spray capillary and 1 μL syringe, the dead volume for ESSI is still 2–3 μL, while a nanospray spectrum can be recorded easily from submicroliter volumes of sample.) The lower limit of sample flow rate depends on the cross-section of the spray capillary, as shown in Table 3. This phenomenon suggests that the main factor preventing still lower flow rates in ESSI is evaporation of solvent from the capillary tip. Since many of the analytes of interest (proteins and other biopolymers) are presumably ionized by the charge residue (CR) process, formation of droplets is essential for their ionization. Evaporation can be suppressed by decreasing the exposed surface of the liquid at the capillary tip. The upper limit to sample flow rates in ESSI is already in the range of conventional HPLC eluent flow rates, implying that the ion source can be used in an LC-MS interface.

The sensitivity of the ESSI technique to matrix effects was tested using aqueous solutions containing varying concentrations of sodium chloride and glycerol. Data are shown in FIGS. 10*a* and 10*b*. Signal intensity vs. NaCl concentration shows that the sensitivity of ESSI to inorganic salts is similar to that of nanospray. However, ESSI is significantly less sensitive to high glycerol concentrations than nanospray or microspray ESI. While 20% glycerol concentrations seem to be incompatible with nanospray, probably because of the high viscosity of the sample, ESSI gives stable signals from solutions with up to 70% glycerol content. In certain cases such as that of lysozyme, ionization by ESSI from pure glycerol-based buffer solutions was successful. High concentrations (0.1–0.5 M) of 2-amino-2-(hydroxymethyl)-1,3-propanediol (Tris base) are also tolerated well by ESSI. This feature can be associated with the fast evaporation process that droplets undergo. Since both the initial droplet size and the liquid/gas ratio are small, evaporation takes place from a high specific surface area and is practically irreversible. Under these conditions, even the evaporation of species having low vapor pressures becomes feasible.

The three main advantages of ESSI are the efficient elimination of peak broadening (FIG. 3), the narrow, usually single-peak charge state distributions in the case of multiply-charged, folded protein ions, and the ability to efficiently ionize protein complexes (see below). Peak broadening when recording protein ions in electrospray mass spectrometry is a well-known, even though a relatively little-studied phenomenon. It is usually attributed to insufficient desolvation of ions in the atmospheric interface or to buffer salt clustering on charge sites of the protein ion. (The effect of non-volatile components such as metal salts or carbohydrates is not considered here, since these interferences are usually easy to eliminate by either buffer exchange or dialysis.) In both cases there are either covalent or ionic clusters present at certain sites of the protein ion. To eliminate these extra species either the composition of the solution phase or the average internal energy of the system can be changed. However, when the main objective of the experiments is to study folded conformations of proteins or protein complexes from a physiological source, serious limitations occur for both alternatives. Changes in solvent or in solution pH induce the unfolding or precipitation of proteins in solution, while high potential gradients in the fore vacuum regime of the atmospheric interface or high ion source temperatures induce similar processes in electrosprayed nanodroplets. Further activation of incompletely desolvated gaseous protein ions may also involve unfolding or dissociation of the structures of interest. Consequently, most of these studies have perforce been carried out under low resolution conditions. The results shown in FIGS. 3 and 11 and in Table 2 clearly show that ESSI avoids the need to make this compromise.

Figure 11:
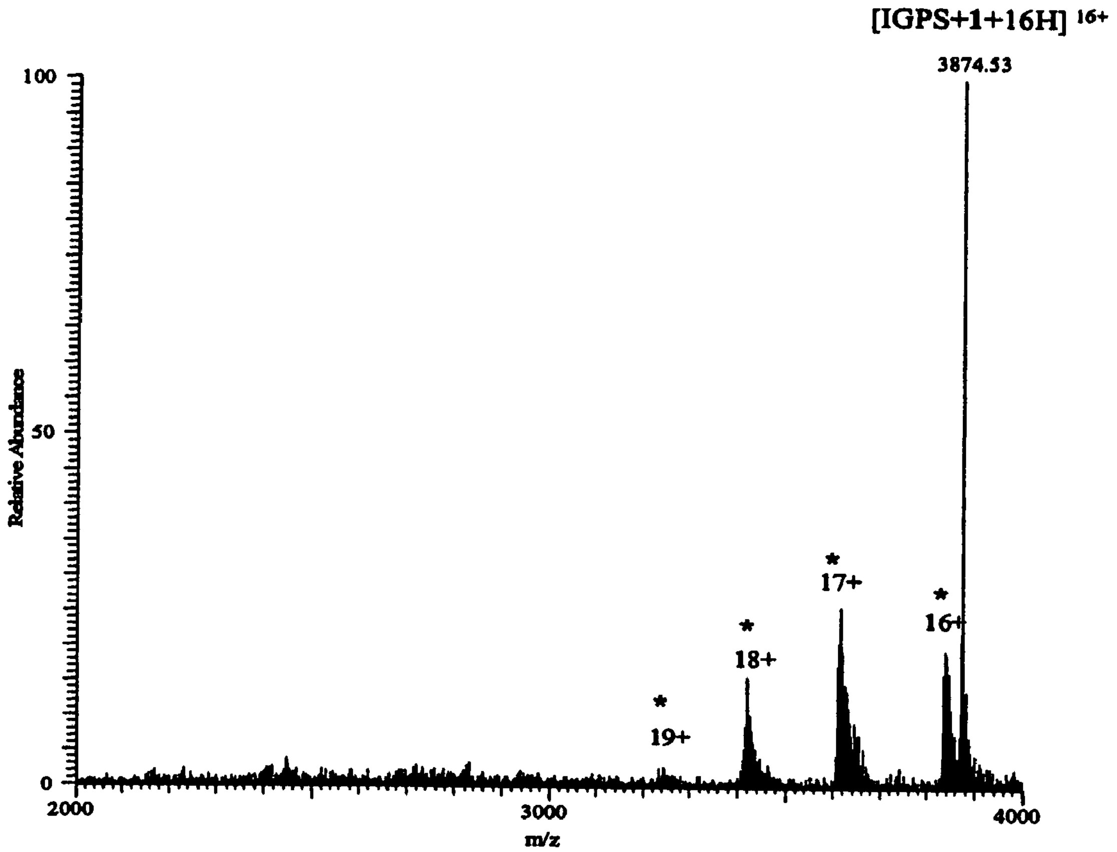
FIG. 11 ESSI spectrum of imidazole-3-glycerol phosphate synthase(IGPS)-N-[5'-phosphoribulosyl)-formimino]-5-aminoimidazole-4-carboxamide ribonucleotide (1,specific inhibitor) mixture containing 10 mM ammonium acetate pH 7.1 and 6 mM PIPES buffer.

FIG. 11 shows that ESSI is effective in producing ions from protein complexes and in doing so exhibits its characteristic of producing extremely narrow peaks dominated by a single charge state. Note a further advantage that appears in this Figure. Under some conditions, such as that used here, some fraction of the protein is denatured; these protein molecules cannot bind to the ligand to form the complex and they appear as a set of broadened peaks in a number of different charge states, indicated by the asterisks. This feature, so familiar from ESI spectra, is seen here in the ESSI spectrum. The remaining protein ions can and do form the complex and they appear as the single abundant complex peak. The ability to distinguish native from denatured proteins is another advantage of ESSI.

The weak dependence of charge state distribution on atmospheric interface settings in ESSI strongly suggests that the main difference between ESSI and ESI (or nanospray) is the location where gaseous ion formation takes place. In the case of traditional electrospray techniques, formation of detected macromolecular ions occurs in the atmospheric interface-ion guide region of the instrument. In ESSI, this process appears to take place in the atmospheric pressure regime of the instrument. In order to provide further evidence for this assumption, lysozyme (100 fm/$\mu$L) was sprayed using ESSI, and the spray was exposed to vapors of the strong base piperidine. As shown in FIGS. 12*a* and 12*b*, the average charge state was shifted from 7 to 6, and extensive adduct formation was observed. The presence of piperidine ($pK_a$=11.8) at only 1 mM concentration in the liquid phase successfully suppresses the ionization of lysozyme. These results clearly show that gaseous protein ions are already present at the atmospheric pressure regime.

Since ESSI yields fully desolvated macromolecular ions at atmospheric pressure, this feature provides the user with the capability of modifying these ions at high pressure. These modifications include separation based on differences in mobility, ion/molecule reactivity, collisional fragmentation, and other processes. The main advantage of atmospheric pressure manipulation of ions is the thermodynamic nature of these processes.

ESSI shows two phenomena which make it different from other electrospray ionization techniques, namely the high desolvation efficiency and the observation of predominantly one charge state for folded protein systems. The good desolvation efficiency can be associated with the small initial droplet size caused by the supersonic nebulizing gas and fast solvent evaporation from the high specific area of small droplets. Evaporation occurs into an environment in which the partial pressure of the solvent is low because of the high nebulizing gas flow rate and this makes resolvation rates low. This helps to explain the fact that in the case of proteins dissolved in aqueous buffers in the physiological pH range, a single charge state is observed in the ESSI spectra. The low temperature of the spray caused by adiabatic expansion of the nebulizing gas and vigorous evaporation of solvent helps preserve the original structure of these molecules. A folded protein structure has a well defined number of buried charges, and it is able to carry a specific number of charges on its surface. This latter number is determined by the apparent gas-phase basicity (GB) values of the basic sites on the surface relative to the gas-phase basicity (GB) of the solvent/buffer. Since the desolvation takes place at high pressure, the system can be assumed to be in a form of thermodynamic equilibrium so these GB values are defineable quantities which strictly determine the surface charge capacity of the protein molecule. It will be readily apparent that the number of charges in the final droplet which contains one single protein molecule will be higher than the charge capacity of the protein molecule. Hence, during complete desolvation, some of the charges are carried away by dissociating buffer or solvent ions or as charged clusters. As a result, the desolvated protein ion is charged up to its capacity and further charge reduction is negligible since the partial pressure of solvent or buffer molecules is sufficiently low.

The combination of electrospray with the use of supersonic nebulizing gas gives rise to a new variant of electrospray—electrosonic spray ionization—with unique features that distinguish the method from other electrospray or sonic spray based methods. The result is a new method with some unique analytical advantages as well as some drawbacks. The analytical performance of the technique, including sample consumption or sensitivity, is more comparable to the widely used nanospray ionization technique than to conventional ESI. In addition, ESSI shows considerably better reproducibility and more robustness than does nanospray. In contrast to nanospray, the main parameters of ESSI (sample flow, nebulizing gas flow, high voltage) can be changed arbitrarily, which provides more control over spectral characteristics.

The most distinctive features of ESSI are the degree of desolvation and the extremely narrow charge state distribution observed. These features are especially important since they suggest ionization of folded protein structures. These phenomena are presumably associated with a shift in the location of ion formation to the atmospheric pressure regime of the instrument. They make ESSI a promising method of allowing protein molecules to be desolvated completely without the loss of tertiary structure and of allowing specific non-covalent structures to be preserved. Similarly, the successive charge reduction of multiply charged protein ions occurs gradually; the individual charge reduction steps are separated in accordance with the different proton affility (PA) values of individual charge sites yielding the observed narrow charge site distributions. Due to these features, the present invention may be successful in allowing transfer of even more complex and delicate structures from solution into the gas phase, enabling more thorough investigations of biochemical systems by mass spectrometry.

REFERENCES (1) Electrospray Ionization for Mass-Spectrometry of Large Biomolecules. Fenn, J. B.; Mann, M.; Meng, C. K.; Wong, S. F.; Whitehouse, C. M. *Science* 1989, 246, 64–71.

(2) Electrospray Ionization-Principles and Practice. Fenn, J. B.; Mann, M.; Meng, C. K.; Wong, S. F.; Whitehouse, C. M. *Mass Spectrometry Reviews* 1990, 9, 37–70.

(3) Probing Conformational-Changes in Proteins by Mass-Spectrometry. Chowdhury, S. K.; Katta, V.; Chait, B. T. *Journal of the American Chemical Society* 1990, 112, 9012–9013.

(4) Evaluation of heat-induced conformational changes in proteins by nanoelectrospray Fourier transform ion cyclotron resonance mass spectrometry. Fligge, T. A.; Przybylski, M.; Quinn, J. P.; Marshall, A. G. *European Mass Spectrometry* 1998, 4, 401–404.

(5) Dynamic protein complexes: Insights from mass spectrometry. Hernandez, H.; Robinson, C. V. *Journal of Biological Chemistry* 2001, 276, 46685–46688.

(6) Protein folding and interactions revealed by mass spectrometry. Last, A. M.; Robinson, C. V. *Current Opinion in Chemical Biology* 1999, 3, 564–570.

(7) Peptide and Protein-Analysis by Electrospray Ionization Mass-Spectrometry and Capillary Electrophoresis Mass-Spectrometry. Loo, J. A.; Udseth, H. R.; Smith, R. D. *Analytical Biochemistry* 1989, 179, 404–412.

(8) Protein complexes take flight. Robinson, C. V. *Nature Structural Biology* 2002, 9, 505–506.

(9) Dissociation of intact *Escherichia coli* ribosomes in a mass spectrometer—Evidence for conformational change in a ribosome elongation factor g complex. Hanson, C. L.; Fucini, P.; Ilag, L. L.; Nierhaus, K. H.; Robinson, C. V. *Journal of Biological Chemistry* 2003, 278, 1259–1267.

(10) A tandem mass spectrometer for improved transmission and analysis of large macromolecular assemblies. Sobott, F.; Hernandez, H.; McCammon, M. G.; Tito, M. A.; Robinson, C. V. *Analytical Chemistry* 2002, 74, 1402–1407.

(11) Probing the nature of noncovalent interactions by mass spectrometry. A study of protein-CoA ligand binding and assembly. Robinson, C. V.; Chung, E. W.; Kragelund, B. B.; Knudsen, J.; Aplin, R. T.; Poulsen, F. M.; Dobson, C. M. *Journal of the American Chemical Society* 1996, 118, 8646–8653.

(12) Thermal dissociation of multimeric protein complexes by using nanoelectrospray mass spectrometry. Benesch, J. L. P.; Sobott, F.; Robinson, C. V. *Analytical Chemistry* 2003, 75, 2208–2214.

(13) Mass-Spectrometric Detection of the Noncovalent Gdp-Bound Conformational State of the Human H-Ras Protein. Ganguly, A. K.; Pramanik, B. N.; Tsarbopoulos, A.; Covey, T. R.; Huang, E.; Fuhrman, S. A. *Journal of the American Chemical Society* 1992, 114, 6559–6560.

(14) Observation of the Noncovalent Quaternary Associations of Proteins by Electrospray-Ionization Mass-Spectrometry. Lightwahl, K. J.; Schwartz, B. L.; Smith, R. D. *Journal of the American Chemical Society* 1994, 116, 5271–5278.

(15) Coexisting Stable Conformations of Gaseous Protein Ions. Suckau, D.; Shi, Y.; Beu, S. C.; Senko, M. W.; Quinn, J. P.; Wampler, F. M.; McLafferty, F. W. *Proceedings of the National Academy of Sciences of the United States of America* 1993, 90, 790–793.

(16) The effect of the source pressure on the abundance of ions of noncovalent protein assemblies in an electrospray ionization orthogonal time-of-flight instrument. Tahallah, N.; Pinkse, M.; Maier, C. S.; Heck, A. J. R. *Rapid Communications in Mass Spectrometry* 2001, 15, 596–601.

(17) Electrospray and Taylor-Cone Theory, Doles Beam of Macromolecules at Last. Wilm, M. S.; Mann, M. *International Journal of Mass Spectrometry and Ion Processes* 1994, 136, 167–180.

(18) Analytical properties of the nanoelectrospray ion source. Wilm, M.; Mann, M. *Analytical Chemistry* 1996, 68, 1–8.

(19) Nanoelectrospray-More than just a minimized-flow electrospray ionization source. Juraschek, R.; Dulcks, T.; Karas, M. *Journal of the American Society for Mass Spectrometry* 1999, 10, 300–308.

(20) Effect of different solution flow rates on analyte ion signals in nano-ESI MS, or: When does ESI turn into nano-ESI? Schmidt, A.; Karas, M.; Dulcks, T. *Journal of the American Society for Mass Spectrometry* 2003, 14, 492–500.

(21) Mechanistic Interpretation of the Dependence of Charge-State Distributions on Analyte Concentrations in Electrospray-Ionization Mass-Spectrometry. Wang, G. D.; Cole, R. B. *Analytical Chemistry* 1995, 67, 2892–2900.

(22) Disparity between Solution-Phase Equilibria and Charge-State Distributions in Positive-Ion Electrospray Mass-Spectrometry. Wang, G. D.; Cole, R. B. *Organic Mass Spectrometry* 1994, 29, 419–427.

(23) Effect of Solution Ionic-Strength on Analyte Charge-State Distributions in Positive and Negative-Ion Electrospray Mass-Spectrometry. Wang, G. D.; Cole, R. B. *Analytical Chemistry* 1994, 66, 3702–3708.

(24) Effect of buffer cations and of H30+ on the charge states of native proteins. Significance to determinations of stability constants of protein complexes. Verkerk, U. H.; Peschke, M.; Kebarle, P. *Journal of Mass Spectrometry* 2003, 38, 618–631.

(25) On the Maximum Charge-State and Proton-Transfer Reactivity of Peptide and Protein Ions Formed by Electrospray-Ionization. Schnier, P. D.; Gross, D. S.; Williams, E. R. *Journal of the American Society for Mass Spectrometry* 1995, 6, 1086–1097.

(26) Charged states of proteins. Reactions of doubly protonated alkyldiamines with NH3: Solvation or deprotonation. Extension of two proton cases to multiply protonated globular proteins observed in the gas phase. Peschke, M.; Blades, A.; Kebarle, P. *Journal of the American Chemical Society* 2002, 124, 11519–11530.

(27) Measurement of Coulomb Energy and Dielectric Polarizability of Gas-Plate Diprotonated Diaminoalkanes. Gross, D. S.; Rodriquezcruz, S. E.; Bock, S.; Williams, E. R. *Journal of Physical Chemistry* 1995, 99, 4034–4038.

(28) Experimental-Measurement of Coulomb Energy and Intrinsic Dielectric Polarizability of a Multiply Protonated Peptide Ion Using Electrospray-Ionization Fourier-Transform Mass-Spectrometry. Gross, D. S.; Williams, E. R. *Journal of the American Chemical Society* 1995, 117, 883–890.

(29) Dissociation of heme-globin complexes by blackbody infrared radiative dissociation: Molecular specificity in the gas phase? Gross, D. S.; Zhao, Y. X.; Williams, E. R. *Journal of the American Society for Mass Spectrometry* 1997, 8, 519–524.

(30) Ion Spray Interface for Combined Liquid Chromatography/Atmospheric Pressure Ionization Mass-Spectrometry. Bruins, A. P.; Covey, T. R.; Henion, J. D. *Analytical Chemistry* 1987, 59, 2642–2646.

(31) Energy Considerations in Twin-Fluid Atomization. Lefebvre, A. H. *Journal of Engineering for Gas Turbines and Power-Transactions of the Asme* 1992, 114, 89–96.

(32) K. Hiraoka, J. Mass Spectrom. in press.

(33) Micro-Electrospray Mass-Spectrometry—Ultra-High-Sensitivity Analysis of Peptides and Proteins. Emmett, M. R.; Caprioli, R. M. *Journal of the American Society for Mass Spectrometry* 1994, 5, 605–613.

(34) Sonic Spray Ionization Method for Atmospheric-Pressure Ionization Mass-Spectrometry. Hirabayashi, A.; Sakairi, M.; Koizumi, H. *Analytical Chemistry* 1994, 66, 4557–4559.

(35) Sonic Spray Mass-Spectrometry. Hirabayashi, A.; Sakairi, M.; Koizumi, H. *Analytical Chemistry* 1995, 67, 2878–2882.

(36) Amino acid clusters formed by sonic spray ionization. Takats, Z.; Nanita, S. C.; Cooks, R. G.; Schlosser, G.; Vekey, K. *Analytical Chemistry* 2003, 75, 1514–1523.

What is claimed si:

1. A method of ionizing a sample material in a liquid comprising:

providing a capillary having a first end adapted to receive said liquid and a second end from which the liquid is projected as a stream, maintaining the second end of the capillary at substantially atmospheric pressure, applying a voltage to the first end of the capillary to generate an electric field at the second end of the capillary, and directing an annular jet of gas past said second end of said capillary in the direction of the liquid stream at a velocity of at least 330 m/s whereby to produce charged ultra-fine droplets of the liquid which, by the adiabatic expansion of the gas and the vigorous evaporation of the liquid, provides gaseous ions of the sample material.

2. A method as in claim 1 in which the annular jet is formed by causing pressurized gas to flow through an annular space between the capillary and a tube surrounding the capillary, the tube having an internal diameter greater than the external diameter of the capillary through which the liquid flows.

3. A method as in claim 1 in which the velocity of the annular jet is between about 330 m/s and 1000 m/s.

4. A method as in claim 1 in which the velocity of the annular jet is between 400–700 m/s.

5. A method as in claim 1 in which the velocity of gas is controlled to control the expansion of the gas and evaporation of the liquid.

6. A method as in claim 1 in which the gas is selected from the group comprising dry air, argon, neon, oxygen and nitrogen.

7. A method as in claim 1 in which the temperature of the gas is between 20° C. and 100° C.

8. A method as in claim 1 in which the temperature of the gas is adjusted to obtain a desired degree of dissolvation of the ultra-fine droplets.

9. An electrospray ionizer for ionizing sample material in a liquid comprising:

a capillary for receiving the liquid at a first end and projecting a stream of the liquid from a second end, means coupled to the first end of the capillary for creating an electric field at the second end of said capillary in the direction of the projected liquid stream, and means for directing an annular jet of gas past the second end of the capillary in the same direction as the projected stream of the liquid at a velocity of at least 330 m/s to thereby produce charged ultra-fine droplets which, by the adiabatic expansion of the gas and the vigorous evaporation of the liquids, provides gaseous ions of the sample material.

10. An electrospray ionizer as in claim 9 further comprising a tube having an internal diameter greater than the external diameter of the capillary, the tube surrounding the capillary to define a capillary space through which pressurized gas flows between the capillary and the second tube to form the gaseous jet.

11. An apparatus for mass analyzing sample material comprising:

a mass analyzer having a sampling port capable of sampling at atmospheric pressure, a capillary for receiving at a first end a sample material in a liquid and projecting a stream of the liquid from a second end with the second end spaced from the sampling port, means coupled to the first end of the capillary for establishing an electric field at the second end of said capillary by applying a voltage between the first end of the capillary and the sampling port, and means for directing an annular gas jet past the second end of the capillary in the same direction as the projected stream of the liquid at a velocity of at least 330 m/s whereby to produce charged ultra-fine droplets which by the adiabatic expansion of the gas and the vigorous evaporation of the liquid provides gaseous ions of the sample material which are drawn through the port into the analyzing apparatus.

12. An apparatus as in claim 11 in which the means for directing an annular gas jet past the second end of the capillary comprises a tube surrounding said capillary to form an annular space and means for causing pressurized gas to flow through said annular space to form the annular gas jet.

13. An apparatus as in claim 11 including means for varying the distance between the end of the capillary and the sampling port.

14. An apparatus as in claim 11 including means for adjusting the distance between ends of the tube and the first and second ends of the capillary.

15. A method as in claim 1 in which the sample material is molecules.

16. A method as in claim 15 in which the molecules are biological molecules.

17. A method as in claim 17 in which the molecules are protein molecules.

18. A system for ionizing a sample material in solution to form gaseous ions at atmospheric pressure comprising:

a conduit for receiving the sample material at a first end and delivering a stream of the sample material at a second end, means for applying a potential to said sample material at the first end of the conduit, and means for directing a stream of gas at supersonic velocity in the direction of the stream of the sample material at the second end of the conduit to interact with the sample stream to produce charged droplets of the sample material which, by the adiabatic expansion of the gas and evaporation of the solution, provides the gaseous ions.

19. A system as in claim 18 in which the means for directing the stream of gas comprises a tube surrounding the conduit to form an annular passage and a source of pressurized gas for supplying gas to said annular passage to form an annular gas stream surrounding the sample stream.

20. A system as in claim 18 in which the ends of the conduit and surrounding tube are adjustable relative to one another.

21. A device for generating gaseous ions of a material of interest at atmospheric pressure from a solution containing the material, the device comprising:

a. a capillary conduit having an output end and an input end through which the solution is supplied;

b. a tube substantially concentric with the capillary conduit, the tube being adapted for delivering a stream of gas annular to the output end at a speed that is supersonic relative to the speed of the solution; the output ends of the capillary and tube through which the solution and the gas respectively, are delivered defining together a nozzle;

c. a power supply for applying an electrical potential to the solution at the input end of the capillary conduit; and d. at least one of (i) a means for adjusting the velocity of the gas stream relative to the velocity of the delivered solution above a supersonic threshold, (ii) a means for adjusting the strength of the electrical potential, (iii) a means for adjusting the position of the end of the first capillary conduit relative to that of the second capillary conduit and (iv) a means for adjusting the device operating temperature;

whereby to produce charged ultra-fine droplets which by adiabatic expansion of the gas and the evaporation of the solution produces the gaseous ions.

22. The device of claim 21 further comprising a mass spectrometer having an inlet for atmospheric sampling positioned to receive at least some of the gaseous ions and a means for varying the distance between the inlet and the nozzle.

23. The device of claim 22 wherein the mass spectrometer is adapted to provide information at least about the mass to charge ratio of the gaseous ions.

24. The device of claim 23 wherein at least one of the means for adjusting the gas stream velocity, means for adjusting the position of the end of the first capillary conduit relative to that of the second capillary conduit, means for adjusting the strength of the electrical potential, means for adjusting the device temperature and means for adjusting the distance between the inlet and the nozzle can be operated to change the relative abundance of gaseous ions produced by the device.

25. A method for producing gaseous ions at atmospheric pressure of a material from a solution containing the material, the method comprising:

a. in a device according to claim 19, delivering the solution to the first end and a stream of the solution from the second end of the capillary conduit into a stream of gas provided at the end of the annular passage, the stream of gas moving at least supersonically relative to the solution.

26. A method as in claim 25 where the material is a protein in an aqueous solution buffered to a physiological pH, the majority of the gaseous ions producing a single chemical species for each component of the solution.

27. A method as in claim 25 where the material is a biological molecule or molecular complex in an aqueous solution buffered to a physiological pH and the gaseous ions produced are substantially a single species for each component of the solution.

28. The method of claim 25 wherein the gaseous ions of sample material are subjected to gas phase atmospheric pressure manipulation.

* * * * *